(12) United States Patent
Audette et al.

(10) Patent No.: US 7,315,940 B1
(45) Date of Patent: Jan. 1, 2008

(54) RECOVERY OF A NETWORK ELEMENT AFTER A RESTART

(75) Inventors: Jocelyn Audette, Chelsea (CA); Craig Parker, Kanata (CA); Christopher Brown, Ottawa (CA); Doug Wong, Gloucester (CA); Sandra Fougere, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 447 days.

(21) Appl. No.: 10/960,154

(22) Filed: Oct. 7, 2004

Related U.S. Application Data (60) Provisional application No. 60/509,157, filed on Oct. 7, 2003.

(51) Int. Cl.
 *G06F 15/177* (2006.01)
 *G06F 9/24* (2006.01)
 *G06F 1/24* (2006.01)
(52) U.S. Cl. .................. 713/2; 713/1; 713/100
(58) Field of Classification Search .......... 713/2
 See application file for complete search history.

(56) References Cited

U.S. PATENT DOCUMENTS

| | | | |
|---|---|---|---|
| 6,446,203 B1 * | 9/2002 | Aguilar et al. | ............ 713/2 |
| 2004/0030883 A1 * | 2/2004 | Munguia et al. | ............ 713/100 |

\* cited by examiner

*Primary Examiner*—Rehana Perveen
*Assistant Examiner*—Stefan Stoynov
(74) *Attorney, Agent, or Firm*—Guerin & Rodriguez, LLP; Michael A. Rodriguez (57) ABSTRACT

Described are a system and method for initializing a traffic card in a network element after a restart. The traffic card receives status information regarding a shelf processor card over a low-level link. If the status information indicates that the shelf processor card is unavailable, the traffic card supports traffic using provisioning data stored at the traffic card. Otherwise, if the status information indicates that the shelf processor card is un-initialized or initializing, the traffic card waits for the shelf processor card to be available. If the shelf processor is operational, the traffic card communicates with the shelf processor card to determine which provisioning data to use. When restarting the card, boot code stored in a first memory bank is executed. If this boot code is determined to be invalid, execution is redirected to boot code stored in a second memory bank to continue the restart process of the card.

5 Claims, 7 Drawing Sheets

RECOVERY OF A NETWORK ELEMENT AFTER A RESTART

RELATED APPLICATION

This application claims the benefit of the filing date of U.S. Provisional Application Ser. No. 60/509,157, filed Oct. 7, 2003, titled "System Recovery for a Network Element," the entirety of which provisional application is incorporated by reference herein.

FIELD OF THE INVENTION

The invention relates generally to system initialization and recovery for a network element. More particularly, the invention relates to a system and methods for initializing cards of a network element in response to restart events.

BACKGROUND

Networks elements in a communications network can experience various problems when initializing on power-up or when restarting after a power failure or a low-voltage brownout. Low-voltage brownouts, for example, can affect the functionality of a regional processor (e.g., CPU), or any tributary card that depends upon the regional processor for local control settings, often referred to as provisioning data. Such problems can result from programming errors in a boot-load director or in any program that the boot-load director program attempts to install. Brownout can also lead to component instability or lockup, due to a lower-than-expected voltage provided to that component. The boot-load director is, in general, the first section of code or software executed when a network element is brought into operation, and determines the subsequent loading of other software, such as a boot-load program or an application program. A subsequently loaded program can then assume control from the boot-loader director for loading software. Another problem that may occur during initialization and restart operations is for executing software to become permanently looped. Such frozen or runaway tasks often require restarting the software.

As an illustrative example of a restart situation in a network environment, consider a system that has a new and unproven version of the boot-load director installed. If the newly installed code of the boot-load director has an error or a code portion that is incompatible with another part of the network element, then the first attempt to execute will fail. The user may then be unable to get the network element operating well enough to reload the previous version of the boot-load director. Thus, there is a known problem in the art of efficiently and automatically restarting and reinitializing network elements during restart procedures.

SUMMARY

In one aspect, the invention features a method of restarting a card in a network element having a plurality of banks of persistent memory. Boot-load director code is stored in a first one of the memory banks and a copy of the boot-load director code is stored in a second one of the memory banks. The boot-load director code stored in the first memory bank is executed in response to a restart. The boot-load director code in the first memory bank is determined to be invalid. Execution is redirected to the boot-load director code stored in the second memory bank to continue a booting process of the card of the network element.

In another aspect, the invention features a method for initializing a traffic card in a network element after a restart. The traffic card receives status information regarding a shelf processor card. If the status information indicates that the shelf processor card is unavailable to provide provisioning data, the traffic card supports traffic using provisioning data stored at the traffic card. Otherwise, the traffic card waits for the shelf processor card to be available if the status information indicates that the shelf processor card is one of un-initialized and initializing, and communicates with the shelf processor card to determine which provisioning data to use if the status information indicates that the shelf processor is operational.

In still another aspect, the invention features a method of handling a brownout condition in a network element. A shelf-processor card in the network element detects a low-voltage condition and transmits a brownout signal simultaneously to each of a plurality of traffic cards in the network element to report the low-voltage condition. Each of the traffic cards, in response to the brownout signal, disable certain functionality of that traffic card during the brownout condition.

In yet another aspect, the invention features a network element for use in an optical communications network. The network element includes a plurality of traffic cards for forwarding traffic through the network. Each traffic card has a processor and memory that stores boot code and application code for booting the traffic card into operation when executed by the processor. Each traffic card is capable of individually booting into operation upon a restart without a storage processor card being currently operational in the network element.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
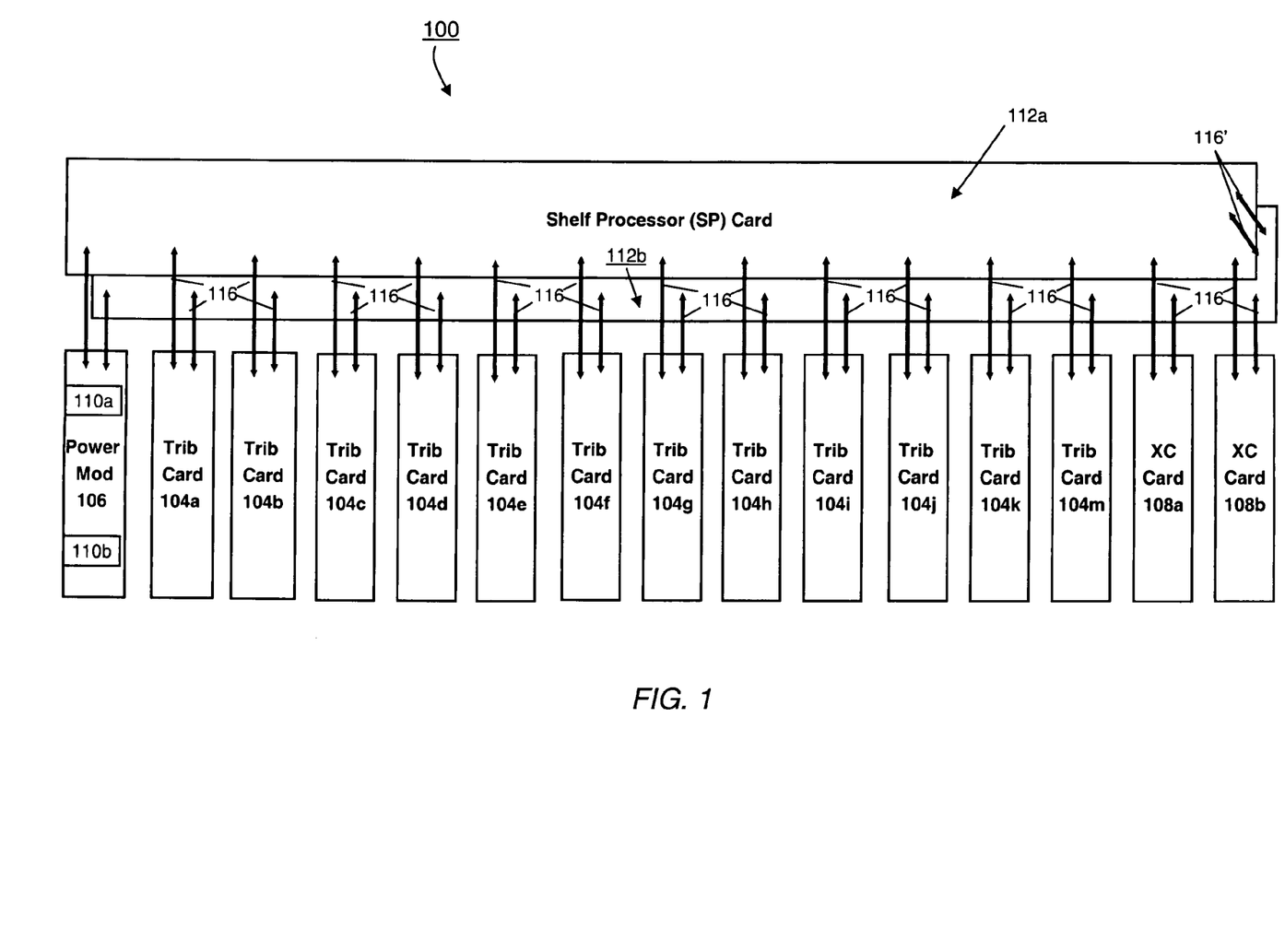
FIG. 1 is a system diagram illustrating an embodiment of a network element including redundant shelf processor cards, each connected to a plurality of tributary cards, a power module, and redundant cross-connect cards.

FIG. 1 shows an embodiment of a network element 100, constructed in accordance with the principles of the invention, for use in a communications network (e.g., optical). The network element 100, also referred to as a shelf, includes a plurality of tributary cards 104a through 104m (generally, Trib card 104), a power module 106, redundant cross-connect cards 108a, 108b (generally, XC card 108), and redundant shelf processor cards 112a, 112b (generally, SP card 112). The power module 106 includes an upper power card 110a and a lower power card 110b for monitoring the power supplies (not shown) of the network element 100. The various cards 104, 108, 112 and the power module 106 are connected to a backplane (not shown). Communication between cards occurs over the backplane.

Direct low-level links 116, shown in FIG. 1 with double-headed arrows, connect each Trib card 104 and each XC card 108 to both SP cards 112. Implemented entirely in hardware (i.e., an electrical trace on the backplane), each link 116 is a dedicated, point-to-point (i.e., direct) connection between one of the SP cards 112 and one of the Trib cards 104 or XC cards 108. Low-level links 116' also connect the SP cards 112a, 112b to each other to enable the exchange of status information even if high-level communications (e.g., Ethernet) fail between the SP cards 112. These links 116, 116' carry low-level signaling information (i.e., a frame comprised of a sequence of bits with each bit having a predefined interpretation based on the position of that bit within the frame and on the value of the bit).

Figure 3:
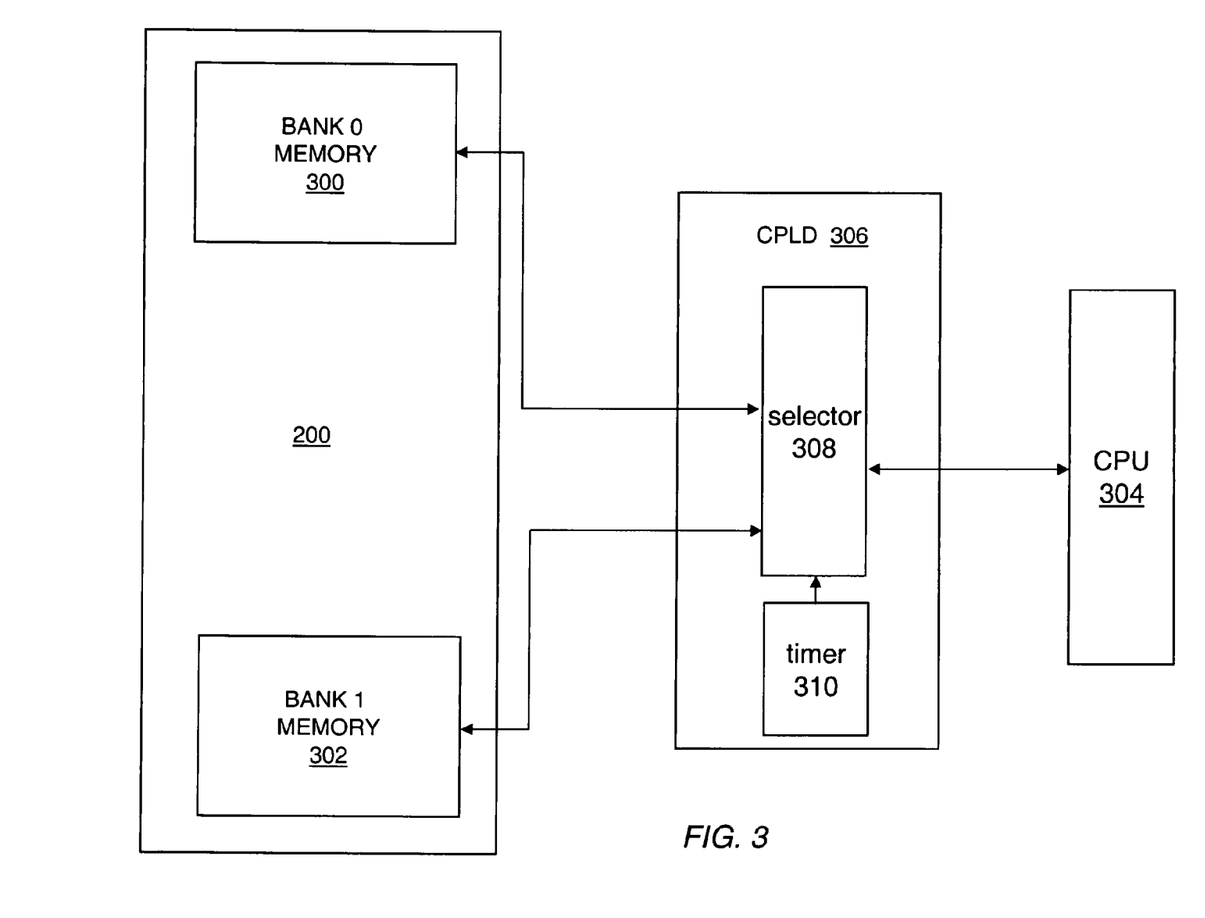
FIG. 3 is a system diagram illustrating an embodiment of the memory organization including a plurality of memory banks and bank-selector logic.
Figure 4:
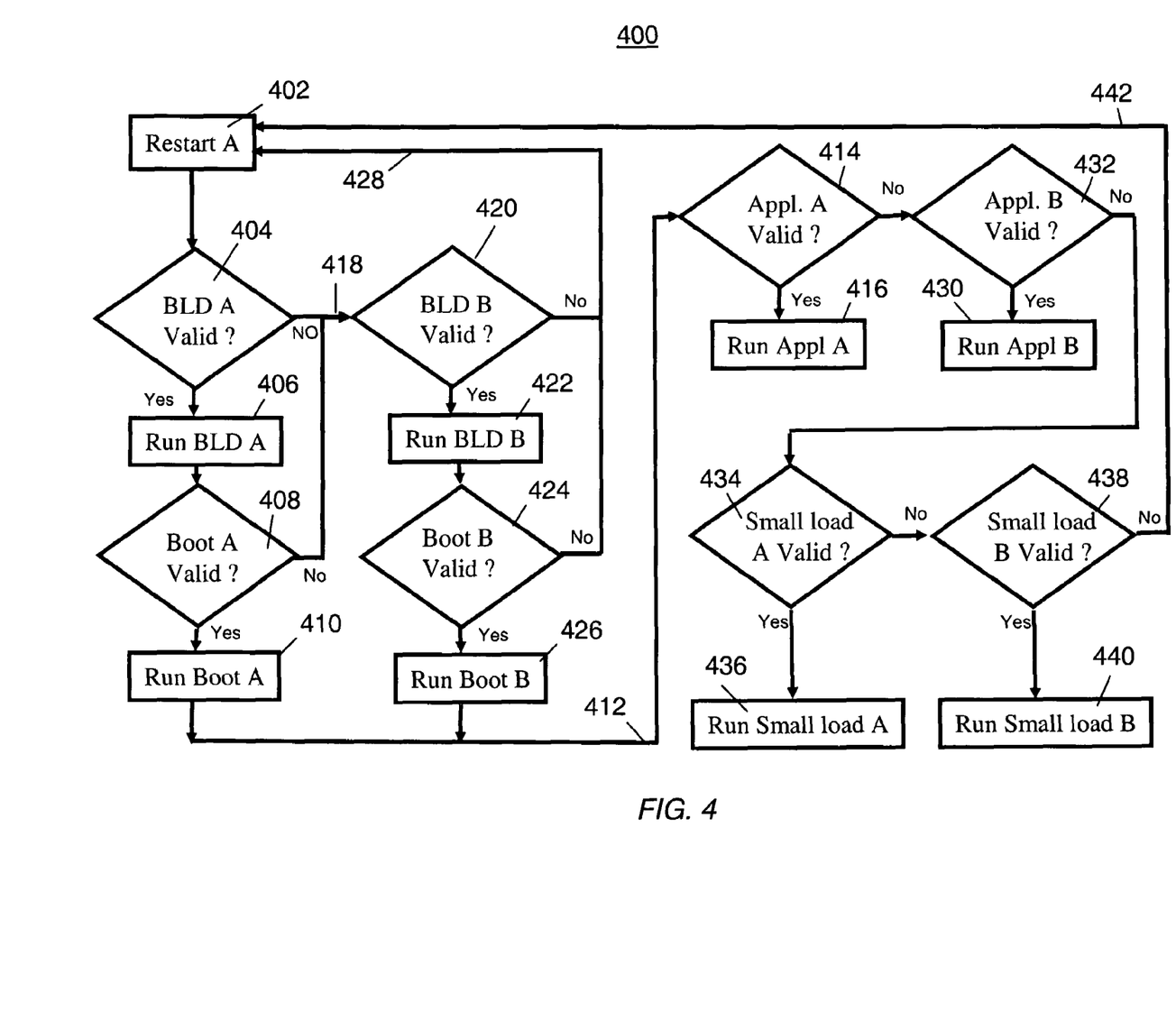
FIG. 4 is a flow chart illustrating an embodiment of a booting process for a network element in accordance with the principles of the invention.

Each Trib card 104, also referred to as a traffic or port card, has a CPU and other logic devices (FIGS. 3 and 4). Generally, the Trib cards 104 receive data signals and produce synchronous transport signals therefrom. Different types of Trib cards 104, for handling different signal formats and different signal rates, can be used to practice the invention. For example, signal formats that can be supported include, but are not limited to, DS1, DS3, E1, E3, Ethernet, OC-3, OC-12, OC-48, and OC-192 (also referred to as high-speed tributary cards). Trib cards supporting electrical signals (e.g., DS1, DS3) are generally referred to as copper tributary cards; those supporting optical signals as optical tributary cards. For optical Trib cards, incoming and outgoing optical signals enter and exit the Trib card 104 through ports in the faceplate. Embodiments of Trib cards 104 have from one (e.g., an OC-192 port) to 32 ports. For copper Trib cards, incoming and outgoing electrical signals pass through an input/output interface card (not shown) before passing to or coming from the tributary card by way of the backplane. The invention can be also be practiced with fewer or more than the twelve Trib cards shown.

Trib cards 104 receive their instructions and provisioning data from the SP cards 112 or, in the absence or availability of SP cards 112, from the XC cards 108. The provisioning data includes a shelf ID, a release number, a slot ID, a card type ID, a provisioning data ID, and a system configuration ID. The shelf ID identifies the particular shelf (and is part of a shelf signature, described below), the slot ID identifies the particular slot in the network element, and the card type ID identifies the particular type of card for which the provisioning data are intended. The release number identifies the software version used to create the provisioning data. The provisioning data ID identifies the version of the provisioning data and the system configuration ID indicates whether an XC card is present in the network element 100. An incremental 16-bit counter maintains a running count representing the provisioning data ID. The counter increases by one every hour. If the card is removed from the network element, and then more than an hour elapses before being returned, the card detects the outdated provisioning file and does not use it for provisioning. The provisioning data ID is also updated upon each change to the provisioning data on the network element. The cards are updated with the new provisioning data ID that is part of the shelf signature.

In addition to handling its own provisioning data, the XC cards 108 provide a backup for the local provisioning data kept by the SP cards 112. When the network element 100 does not have an SP card 112, the XC card 108 provides shelf IDs to the Trib cards 104. Network elements can operate without redundant XC cards 108 to practice the invention. Network elements not having any are applicable in transponder applications (i.e., wavelength translation). Instead of XC cards, a transponder application has additional Trib cards 104 in those slots occupied by the XC cards 108 in FIG. 1.

The SP cards 112 coordinate the recovery of provisioning data for the system on restarts, such as system power on, and also control distribution of data to individual Trib and XC cards 104, 108. The SP cards 112 operate in parallel. One SP card 112 functions as a master SP card and the other as a slave. The invention can also be practiced in the absence of any SP cards 112 in the network element 100, a single SP card 112, or any number of SP cards, depending upon the requirements of the particular network element, without departing from the spirit of the invention.

Figure 2:
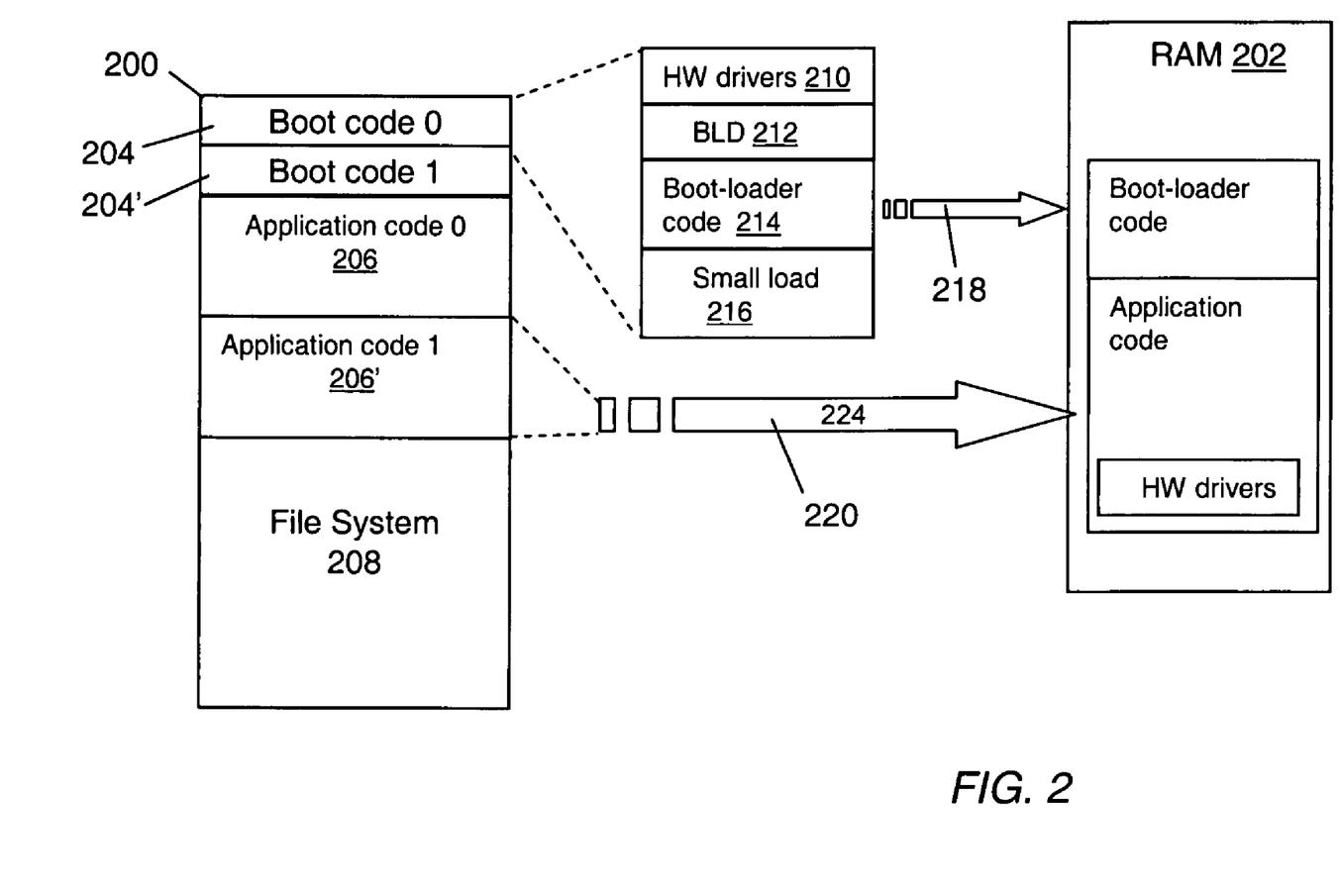
FIG. 2 is system illustrating an embodiment of an organization of memory for storing boot code and application code.

Referring now to FIG. 2, each card 104, 108, 112 in the network element 100 includes persistent (or non-volatile) memory 200, such as Flash media, and random access memory or RAM 202. The persistent memory 200 stores two copies of boot code 204, 204' (generally, boot code 204), two copies of application code 206, 206' (generally, application code 206), and a file system 208. The boot code 204 includes hardware drivers 210, a boot-load director (BLD) 212, boot-loader code 214, and a small load 216. The small load 216 may include a minimal set of application programs necessary to enable enough functionality of the card so that a user can analyze the failure to the system. These application programs may comprise a known-good set of programs installed at the factory in a write-protected portion of the memory 200.

The booting process for each card of the network element includes four phases: 1) a boot sequence, 2) application initialization, 3) provisioning and traffic recovery, and 4) normal operation. During the boot sequence phase, the boot-load director 212 executes in the persistent memory 200 and performs minimal hardware initialization. The boot-load director 212 copies the boot-loader code 214 into the RAM 202 (arrow 218) and passes control of execution to the boot-loader code 214. The boot-loader code 214 executes in RAM 202 and validates the application code 206. If neither the application code 206 nor the application code 206' is valid, the boot-loader code 214 causes execution of the small load 216 to provide limited functionality. If one of the copies of the application code 206 is valid, the boot code 214 copies (arrow 220) that application code 206 from the persistent memory 200 to the RAM 202. In one embodiment, the application code is stored in a compressed state, and the copying process may include decompressing the application code 206 before storing it into the RAM 202. Execution control then passes from the boot-loader code 214 to the application code 206, and the application initialization phase begins.

The application code 206 executes from the RAM 202 to complete hardware initialization, to initialize the operating system and the file system 208, after which provisioning and traffic recovery can occur, and then to start execution of the application program specific to the type of card to achieve normal operation. The operation of the card during the provisioning and traffic recovery phase depends upon the type of card that is booting.

In one embodiment, a portion of the persistent memory 200 has factory-installed driver code stored therein to provide the card with baseline functionality. This factory-installed driver code can be for devices that are likely to experience revisions in future card designs. Examples of driver code for establishing baseline functionality include, but are not limited to, code for configuring SDRAM and other chip select settings, for loading a flash driver, a field-programmable gate array (e.g., FPGA 516 in FIG. 5) and the VTU (VDSL transmission unit), and for setting a baud rate. Any device driver can be factory installed without departing from the principles of the invention. The portion of memory 200 storing the factory-installed driver code is "write protected" to prevent inadvertent or deliberate changes to the known good driver code.

With the baseline functionality already installed on the card, additional driver code can then be installed during a normal software load. If this software-installed driver code is a newer revision than the factory-installed driver code, the application code 206 can execute the newer driver code. If the software-installed driver code is invalid, or if the software-installed driver code is an older version than the factory-installed driver code, then the application code 206 can use the factory-installed driver code to provide baseline functionality for the card.

FIG. 3 and FIG. 4 illustrate the restart process in more detail. FIG. 3 shows the persistent memory 200 as partitioned into two banks of memory: bank 0 memory 300 and bank 1 memory 302. The two memory banks 300, 302 shown are illustrative: other embodiments of the present invention may require any number of memory banks. Each card 104, 108, 112 also has a central processing unit (CPU) 304 and a complex programmable logic device (CPLD) 306. The CPLD 306 includes a selector 308 and a timer 310. A copy of the boot code 204 (having the boot-load director 212, boot-loader code 214, and small load 216) and application code 206 resides in the bank 0 memory 300 and in the bank 1 memory 302. The copies stored in each memory bank 300, 302 may be of the same or of different versions of the same program, or different types of programs with the same purpose. The selector 308 is in communication with each memory bank 300, 302 and provides a path between the CPU 304 and a select one of memory banks 300, 302 so that the CPU 304 can obtain program instructions for execution. The timer 310 provides a mechanism for determining whether the currently executed program instruction is performing properly.

FIG. 4 shows an embodiment of a process 400 for restarting the network element 100 in response to a restart caused, for example, by a power-on restart. Through the selector 308 of the CPLD 306, the CPU 304 selects one of the boot codes 204, 204' stored in the memory bank 0 300 and memory bank 0 302, respectively. In the description of the process 400, the letter "A" represents the first of the memory banks 300, 302 to be accessed by the CPU 304 in response to the restart, and the letter "B" represents the other memory bank. For example, if the first accessed memory bank is the bank 1 memory 302, then the letter "A" represents the bank 1 memory 302 and the letter "B" represents the bank 0 memory 300.

The following describes the process 400 when the various portions of code accessed by the CPU 304 execute successfully. At restart (step 402), the CPU 304 accesses an instruction stored at an address of the bank A memory, to start execution of the boot-load director A (212 or 212'). If the boot-load director A of memory bank A is valid (step 404) and executes (step 406) successfully, the CPU 304 accesses and copies into RAM 202 the boot-loader code A (214 or 214') of memory bank A. If the boot-loader code A is valid (step 408) and executes successfully (steps 410), then the CPU 304 selects (step 412) the application code A (206 or 206') of memory bank A for validation and execution. The CPU 304 installs a copy of the application code A in RAM 202. When the application code A is valid (step 414) and executes (step 416) successfully, the card is operational.

The following describes the process 400 when either the boot-load director A or the boot-loader code A is invalid. In general, execution passes to the boot-load director B of memory bank B if either the boot-load director A or boot-loader code A of memory bank A does not or cannot execute or is otherwise determined invalid, e.g., because the timer 310 expires without the successful completion of a current instruction. Thus, the process 400 gives the card of the network element two opportunities, if necessary, to execute a boot-load director successfully.

More specifically, if either the boot-load director A (at step 404) or the boot-loader code A (at step 408) is invalid, the CPLD 306 resets (step 418) the CPU 304. After the reset, the CPU 304 executes as though to access the starting address of bank A memory, but the selector 308 decodes the starting address and redirects the CPU 304 to the starting address of the boot-load director B of the memory bank B. If the boot-load director B of memory bank B is valid (step 420) and executes (step 422) successfully, the CPU accesses and copies the boot-loader code 214 into RAM 202.

If the boot-loader code B is valid (step 424) and executes (step 426) successfully, then the CPU 304 selects (step 412) the application code A of memory bank A for validation and execution. After the boot-load director B executes successfully, and after the boot-loader code B and application code are copied into the RAM 202, the address decoding functionality of the selector 308 is turned off. In one embodiment, the CPU 304 selects the application code A of the memory bank A irrespective of the memory bank from which the successfully executed boot-loader code was taken. Alternatively, the CPU 304 can select the application code from the same memory bank as the successfully executed boot-loader code (i.e., here, memory bank B).) If, however, either the boot-load director B or the boot-loader code B of memory bank B is invalid (steps 420 and 424, respectively), then the CPU 304 restarts (step 428), e.g., the CPLD 306 signals a reset to the CPU 304.

The following describes the process 400 if one or both of the application codes A, B are invalid. In general, the card of the network element 100 has two opportunities to launch and execute application code successfully: the application code A of memory bank A or the application code B of memory bank B. If the application code A is invalid (step 414), the CPU 304 accesses the other memory bank B, and the application code B of memory bank B is copied to RAM 202 for execution. (After a boot-load director executes successfully, redirection to the opposite memory bank occurs without having to reset the CPU 304.) If the application code B of memory bank B is also invalid (step 432), the CPU 304 accesses the small load A (216, 216') of memory bank A. If the small load A is valid (step 434) and executes (step 436) successfully, then the card can operate with basic functionality for debugging purposes. If this small load A proves invalid (step 434), the CPU 304 accesses the small load B of memory bank B. If the small load B is valid (step 438) and executes successfully (step 440), then the card can operate with basic functionality for debugging purposes. If instead the small load B of memory bank B is also invalid (step 438), the CPU 304 restarts (step 442).

Figure 5:
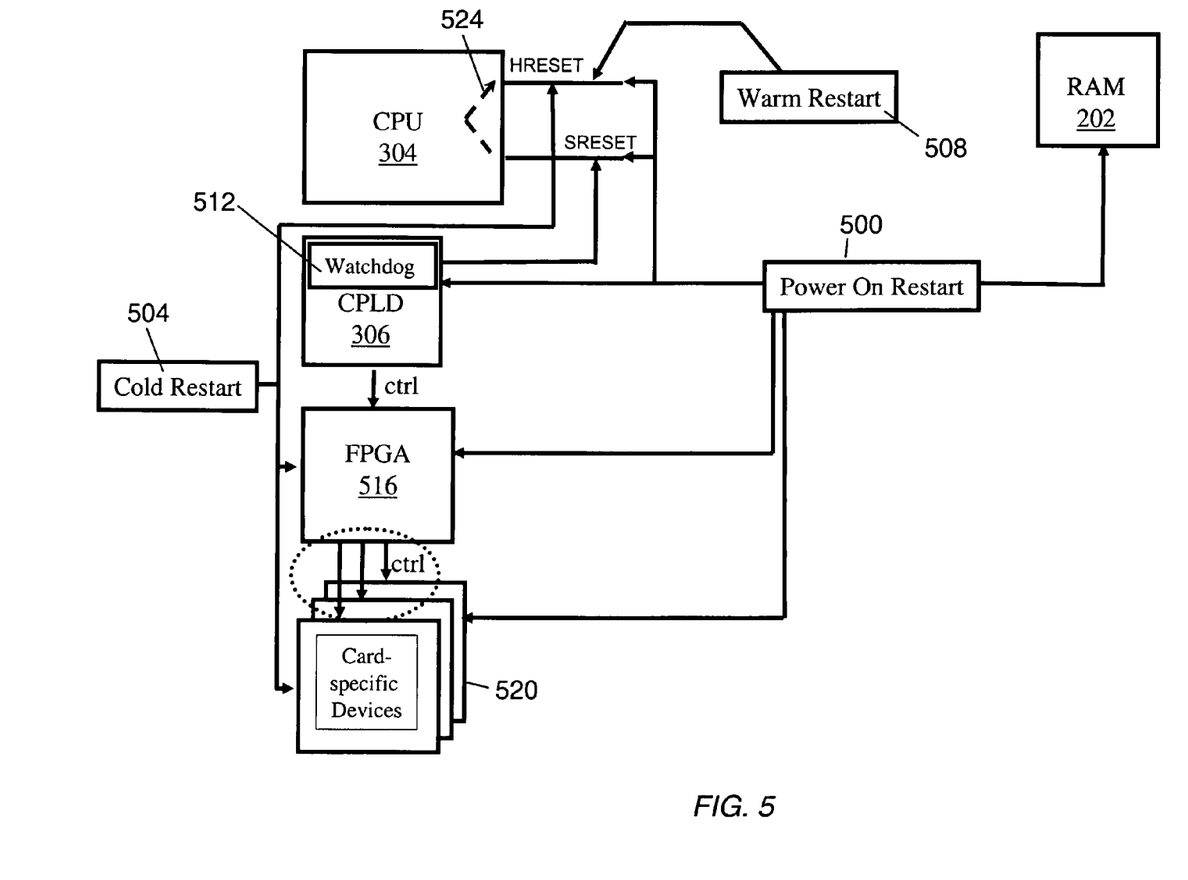
FIG. 5 is exemplary system diagram illustrating various restart operations and various devices affected by the restart operations.

Various types of operational situations occur in which each card of the network element may need to perform a restart operation in order to provide initial or continued network function. Such situations include software failures, system power-ups, and brownouts (i.e., the power-supply voltage goes below a specified voltage level). In these situations the restart operation typically includes the boot-operation sequence, followed by initialization of application programs (which may include hardware drivers), and then normal network operation, as described above. FIG. 5 illustrates the various types of operational restarts, including power-on 500, cold restart 504, warm restart 508, and watchdog 512, and the devices of the card that are affected by each restart type.

For a given card, a power-on restart 500 occurs when that card powers up and results in a hard-reset of all devices on the card, including the RAM 212, the CPU 304, the CPLD 306, a field programmable gate array (FPGA) 516, and each card-specific device 520. The boot-operation sequence (i.e., boot-load director and boot-loader code) and a power-on self-test (POST) occur during the power-on restart 500. Restart starts with the bank 0 memory 300 by default. Testing eliminates any existing information in the RAM 212. Software also reinitializes (SRESET). In the power-on restart, the hardware devices including the FPGA 516 are re-provisioned with local settings and data from the shelf processor 112 (FIG. 1), or from available local sources if the shelf processor is temporarily unavailable.

A cold restart 504 can occur because of a user- or a system-initiated request. For example, a user request can come through a TL1 command; a system request can be in response to a brownout recovery. The boot-operation sequence (i.e., boot-load director and boot-loader code) executes without performing POST. Accordingly, information stored in designated portions of the RAM memory 202 remains intact. Execution of the boot-operation sequence starts by default with the memory bank that is currently running at the time of the cold restart. The cold restart 504 causes a hard reset of the CPU 304, FPGA 516, and card-specific devices 520 on the network element card. The cold restart 504 also permits execution of code for performing card-specific activities. Such function calls, if performed, may occur pre-kernel, that is, after reset of the hardware and before the operating system is running, and are not permitted to make operating system calls. Like the power-on restart 500, during the cold restart 504 the hardware devices are re-provisioned (i.e., reloaded).

A warm restart 508 can also occur because of a user- or system-initiated request. An example of a system request is a fatal software error. The warm restart 508 causes a hard reset of the CPU 304, under the control of the CPLD 306, while the other devices on the card, such as the FPGA 516, remain unaffected. Similar to the cold restart 504, the boot-operation sequence executes without performing POST and execution starts by default with the memory bank that is currently running at the time of the warm restart. The warm restart 508 also permits pre-kernel execution of code for performing card-specific activities. Hardware devices, such as the FPGA 516, are not reset or re-provisioned during the warm restart 508.

A watchdog restart 512 typically occurs if a program operation becomes looped or frozen, or if a task executes indefinitely, and the timer 310 (FIG. 3) of the CPLD 306 expires. Similar to the warm restart 508, the watchdog restart resets the CPU 304, while the other devices on the card, such as the FPGA 516, remain unaffected. The boot-operation sequence executes without performing POST. Execution starts by default with the memory bank that is currently running at the time of the watchdog restart and can include code for performing card-specific activities. The FPGA 516 is neither reset nor re-provisioned. The watchdog restart 512 invokes execution of "trap" code for logging information including the type of restart and register information. In one embodiment, no more than two watchdog restarts are permitted within a predetermined period. A third watchdog restart within that period triggers a cold restart.

Shelf-wide Restart

Figure 6:
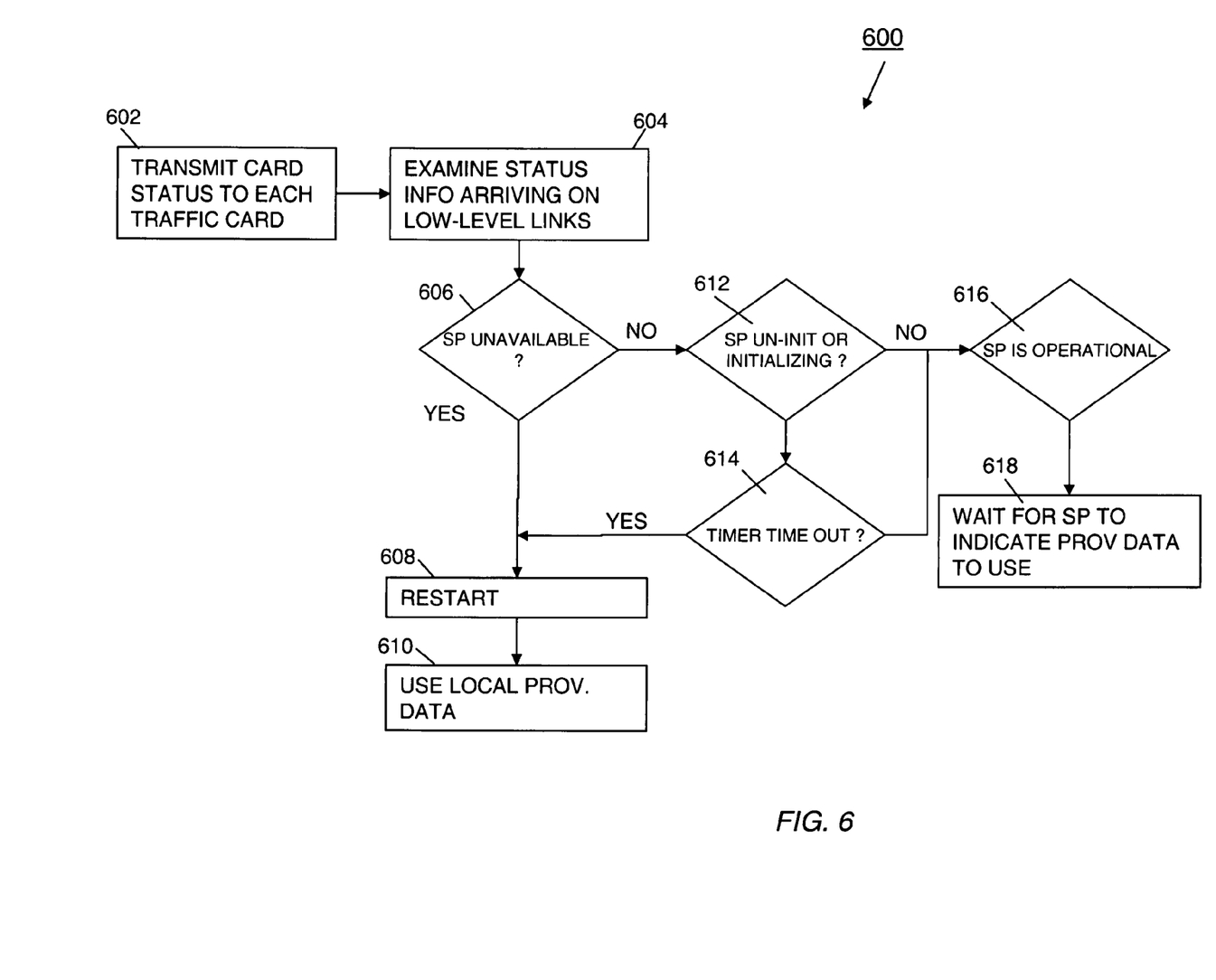
FIG. 6 is a flow chart illustrating an embodiment of a process for performing a shelf-wide restart.

FIG. 6 shows an embodiment of a process 600 for performing a shelf-wide restart of the network element in response to a power-on or a cold restart. After the restart, each card in the network element 100 returns to normal operation independently of the other cards and according to its own restart policy. During normal operation, the cards 104, 108 communicate with the SP cards 112 using a high-level protocol, such as 100baseT Ethernet. During the restart, before being able to communicate using the high-level protocol, the SP cards 112a, 112b communicate with each of the cards 104, 108 using the dedicated low-level links 116 shown in FIG. 1. In step 602, each SP card 112 uses the low-level links 116 to transmit information, such as its card status, to the other cards 104, 108, and each of these other cards 104, 108 use its dedicated link 116 to communicate its card status to the SP cards 112. The types of card status include 1) unavailable, 2) un-initialized, 3) initializing, and 4) operational.

In one embodiment, four bits transmitted over the low-level links 116 indicate the card status of the card transmitting the status information. If the bit values of the four bits are 1111, the transmitting card is operational. If the four bits are 1110, the transmitting card is initializing normally. Bit values of 1101 indicate that the card is un-initialized, and when the bit values are 1100, the card is unavailable. Bit values of 0000 represent an invalid condition to be interpreted that the card is unavailable.

To determine a recovery technique to use, each Trib card 104 examines (step 604) the card status information arriving on the low-level links 116 from the SP cards 112. If no SP cards are present in the network element or if the card status from each SP card 112 indicates that the SP cards 112 are unavailable (step 606), the Trib cards 104 can restart (step 608) and return (step 610) to supporting traffic using provisioning data stored at that Trib card 104. If the card status indicates that the SP cards 112 are un-initialized or initializing (step 612), each of the Trib cards 104 waits either until a timer times out (step 614), indicating that the SP cards 112 are unable to initialize, or until one of the SP cards 112 becomes operational (step 616). If the timer expires before one of the SP cards 112 becomes available, the Trib cards 104 restart (step 608) and return (step 610) to supporting traffic using locally stored provisioning data. If one of the SP cards 112 becomes operational before the timer expires (step 616), the Trib cards 104 are able to communicate with the SP card 112 using the high-level protocol. Accordingly, the Trib cards 104 wait for instruction (step 618) from the SP card 112 as to which provisioning data to use, i.e., the locally stored provisioning data or shelf processor-provided provisioning data.

If the SP cards 112 are unavailable, each Trib card 104 may then communicate with the XC cards 108 to determine if that Trib card may use its locally stored provisioning data to perform its function. This communication between the Trib cards 104 and the XC cards 108 occurs over a second set of dedicated links (i.e., not the low-level links). During this communication, the XC card transmits a shelf signature (i.e., a unique identifier) that the Trib card 104 compares to its locally stored version of a shelf signature. The shelf signature may be part of the provisioning data. In one embodiment, the shelf signature is a separate file (i.e., data item) than the provisioning data. If the signatures agree, the implication is that the same shelf processor configured the XC card and this Trib card together at the same time. Accordingly, the Trib card is able to use its locally stored provisioning data to support traffic. Dissimilar signatures indicate to the Trib card that its provisioning data may be unreliable and is not to be used.

If the SP card 112 is available, that SP card 112, using the high-level protocol, queries each card to obtain shelf signatures from all of the cards. By comparing these shelf signatures with its locally stored shelf signature, the SP card 112 determines to what extent the network element is intact (e.g., are the signatures the same with respect to each other and are the signatures all provided by this SP card). The SP card 112 can also access a system identifier associated with the network element to determine if the signatures stored at the cards are based on this system identifier. In one embodiment, this system identifier is stored in memory on the backplane. When providing signatures to each of the cards 104, 108, the SP card 112 uses the system identifier to generate shelf signatures. Thus, based on a comparison between the shelf identifier and the shelf signatures stored at the cards, the SP card 112 can determine whether each card belonged to the network element 100 when provisioned.

The SP card 112 distributes provisioning data to each Trib card 104 determined to have a shelf signature that is inconsistent with the system identifier. The SP card 112 also distributes shelf signatures based on the system identifier to each Trib and XC card 104, 108, to ensure to that each card has the same shelf signature. This closely associates the current provisioning data stored at each card to the particular network element in which the cards are operating.

If the SP card 112 determines that the network element is intact, the SP card 112 communicates with the Trib cards 104 to use their locally stored provisioning data. If the signature of the SP card 112 is different from the signatures of the other cards and from the system identifier, the SP card 112 collects the provisioning data from those cards and locally stores the collected provisioning data as its own.

Brownout Detection and Recovery

Figure 7:
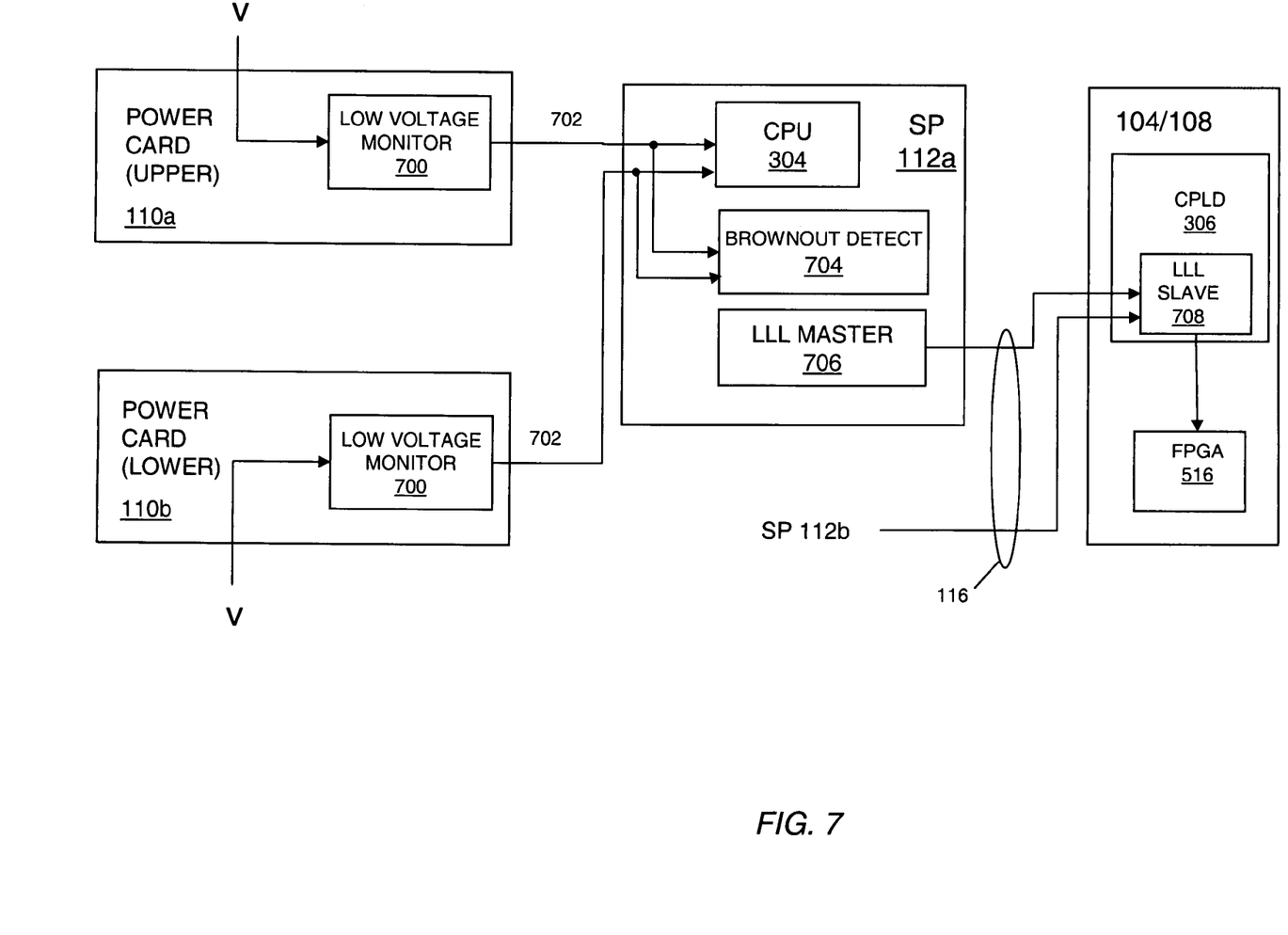
FIG. 7 is an exemplary system diagram for detecting a brownout condition in the network element and notifying the other cards in the network element of the brownout condition.

Referring now to FIG. 7, during the normal operation of the network element 10, each power card 110a, 110b (FIG. 1) has a monitor circuit 700 for detecting low voltage. If either or both power cards 110a, 110b detect that the voltage drops below a predefined threshold, that power card sends a low-voltage signal 702 to both SP cards 112a, 112b over the backplane. In one embodiment, the threshold voltage for triggering a brownout condition is −37 volts on a normal −48 volt supply. Brownout detect circuitry 704 of each SP card 112 determines that a low-voltage condition has occurred when that SP card receives a low-voltage signal from more than one power card. (In an alternative embodiment, receipt of a single low-voltage signal from one power card is sufficient to signal a brownout.) The SP cards 112a, 112b then notify the Trib cards 104 and the XC cards 108 of the brownout.

Notification of the brownout occurs over the low-level links 116 between the SP cards 112 and each of the Trib and XC cards 104, 108. A low-level link (LLL) master 706 of each SP card 112 continuously transmits frames over the low-level links 116 to a LLL slave 708 on each of the other cards 104, 108 in the network element 100. In one embodiment, the frames are 125 microseconds in duration. A bit reserved in each frame operates as a brownout signal. Each SP card 112 sets this bit (e.g., to a 1 value) when that SP card 112 detects the brownout condition. Use of the low-level links 116 to deliver the brownout signal enables each of the Trib and XC cards 104, 108 to become aware of the brownout condition simultaneously and immediately after the brownout condition occurs. The speed of such notification far exceeds that experienced with conventional notification techniques, which often use high-level protocol communications (e.g., Ethernet) to alert the Trib cards 104 of the brownout.

The Trib cards 104 recognize a brownout signal from the master SP card 112 only and ignore a brownout signal from the slave SP card 112. In response to a brownout signal from the master SP card 112, each Trib card 104 disables local alarm events, hardware fail detection, protection switching, and restarts, such as a warm restart or a watchdog restart, during the brownout condition.

After the brownout condition has ended, the SP cards 112 notify the Trib and XC cards 104, 108 by toggling the brownout signal sent over the low-level links 116. The SP cards 112 send this end-of-brownout signal for a predetermined period to ensure that each card 104, 108 detects the brownout transition. Then each SP card 112 initiates a hard reset of itself. In response to the end-of-brownout signal, each notified card 104, 108 sets a brownout flag and initiates a cold restart. Each card 104, 108 recovers locally, as described above, and sets another flag to indicate recovery from the brownout. These flags operate as a local indicator for the card to recognize that it does not need to wait for the SP card to resume handling traffic because recovery was in response to a brownout restart.

While the invention has been shown and described with reference to specific preferred embodiments, it should be understood by those skilled in the art that various changes in form and detail may be made therein without departing the spirit and scope of the invention as defined by the following claims.

What is claimed is:

1. A method of restarting a card in a network element having a plurality of banks of persistent memory, the method comprising:

storing boot-load director code, boot-loader code, and application code in a first one of the memory banks and copies of the boot-load director code, boot-loader code, and application code in a second one of the memory banks;

executing the boot-load director code stored in the first memory bank in response to a restart of the card;

if the boot-load director code in the first memory bank is valid, copying, by the boot-load director code, the boot-loader code in the first memory bank into random access memory (RAM) and passing execution to the boot-loader code in the RAM, otherwise redirecting execution to the boot-load director code stored in the second memory bank, which copies the boot-loader code stored in the second memory bank into RAM and passes execution to the boot-loader code in the RAM;

selecting, by the boot-loader code executing in the RAM, one of the memory banks in order to validate the application code stored therein; and if the application code in the selected memory bank is invalid, selecting, by the boot-loader code executing in the RAM, the other of the memory banks in order to validate the application code stored therein.

2. The method of claim 1, wherein the restart is one of a power-on restart, a cold restart, a warm restart, and a watchdog restart.

3. The method of claim 1, wherein the step of determining that the boot-load director code in the first memory bank is invalid includes using a timer to measure whether the boot-load director code is executing properly.

4. The method of claim 1, further comprising:

storing a small load in the first memory bank and a copy of the small load in the second memory bank, the small load being capable of providing basic functionality for the card to enable debugging;

determining that the application code in the first and second memory banks are invalid;

selecting the small load in one of the memory banks in response to determining that the application code in the first and second memory banks are invalid; and executing the selected small load to provide the card with the basic functionality.

5. The method of claim 1, further comprising the step of redirecting execution to the boot-load director code stored in the second memory bank if the boot-loader code in the first memory bank is invalid when execution is passed thereto.

* * * * *